United States Patent
Labauze et al.

(10) Patent No.: US 7,253,225 B2
(45) Date of Patent: *Aug. 7, 2007

(54) RUBBER COMPOSITION FOR A TIRE TREAD

(75) Inventors: Gerard Labauze, Clermont-Ferrand (FR); Didier Vasseur, Clermont-Ferrand (FR)

(73) Assignee: Michelin Recherche et Technique, S.A., Granges-Paccot (CH)

( * ) Notice: Subject to any disclaimer, the term of this patent is extended or adjusted under 35 U.S.C. 154(b) by 82 days.

This patent is subject to a terminal disclaimer.

(21) Appl. No.: 11/071,500

(22) Filed: Mar. 3, 2005

(65) Prior Publication Data

US 2005/0148713 A1 Jul. 7, 2005

Related U.S. Application Data

(63) Continuation of application No. PCT/EP03/09334, filed on Aug. 22, 2003.

(30) Foreign Application Priority Data

Sep. 4, 2002 (FR) .................. 02 10950

(51) Int. Cl.
*C08L 91/00* (2006.01)

(52) U.S. Cl. ............... 524/313; 524/482; 524/490

(58) Field of Classification Search ......... 524/313, 524/482, 490
See application file for complete search history.

(56) References Cited

U.S. PATENT DOCUMENTS

| | | | |
|---|---|---|---|
| 3,842,111 A | 10/1974 | Meyer-Simon et al. | 260/448.2 E |
| 3,873,489 A | 3/1975 | Thurn et al. | 260/33.6 |
| 3,978,103 A | 8/1976 | Meyer-Simon et al. | 260/448.8 R |
| 3,997,581 A | 12/1976 | Pletka et al. | 260/448.8 R |
| 4,002,594 A | 1/1977 | Fetterman | 260/42.37 |
| 4,072,701 A | 2/1978 | Pletka et al. | 260/448.8 R |
| 4,129,585 A | 12/1978 | Buder et al. | 260/448.8 R |
| 4,550,142 A | 10/1985 | Akita et al. | 525/236 |
| 4,848,511 A | 7/1989 | Ohyama et al. | 180/312 |
| 5,066,721 A | 11/1991 | Hamada et al. | 525/102 |
| 5,252,649 A | 10/1993 | Hausmann | 524/313 |
| 5,580,919 A | 12/1996 | Agostini et al. | 524/430 |
| 5,583,245 A | 12/1996 | Parker et al. | 556/427 |
| 5,650,457 A | 7/1997 | Scholl et al. | 524/262 |
| 5,663,358 A | 9/1997 | Cohen et al. | 548/166 |
| 5,663,395 A | 9/1997 | Gobel et al. | 556/427 |
| 5,663,396 A | 9/1997 | Musleve et al. | 556/427 |
| 5,674,932 A | 10/1997 | Agostini et al. | 524/430 |
| 5,675,014 A | 10/1997 | Cohen et al. | 548/110 |
| 5,684,171 A | 11/1997 | Wideman et al. | 556/427 |
| 5,684,172 A | 11/1997 | Wideman et al. | 556/427 |
| 5,696,197 A | 12/1997 | Smith et al. | 524/495 |
| 5,708,053 A | 1/1998 | Jalics et al. | 523/200 |
| 5,852,099 A | 12/1998 | Vanel | 524/494 |
| 5,892,085 A | 4/1999 | Munzenberg et al. | 552/427 |
| 5,900,449 A | 5/1999 | Custodero et al. | 524/430 |
| 5,967,211 A | 10/1999 | Lucas et al. | 152/209.4 |
| 5,977,238 A | 11/1999 | Labauze | 524/492 |
| 6,013,718 A | 1/2000 | Cabioch et al. | 524/506 |
| 6,245,873 B1 * | 6/2001 | Wideman et al. | 526/283 |
| 6,610,261 B1 | 8/2003 | Custodero et al. | 423/127 |
| 6,890,981 B1 | 5/2005 | Luginsland | 524/262 |
| 2004/0132880 A1 | 7/2004 | Durel et al. | 524/262 |

FOREIGN PATENT DOCUMENTS

| | | |
|---|---|---|
| EP | 0 561 761 A1 | 2/1993 |
| EP | 0735088 | 10/1996 |
| EP | 0810258 | 12/1997 |
| EP | 0 899 297 A2 | 3/1999 |
| EP | 0 899 297 A3 | 8/1999 |
| EP | 1043357 | 10/2000 |
| FR | 2526030 | 11/1983 |
| FR | 2740778 | 5/1997 |
| FR | 2765882 | 1/1999 |
| WO | WO 88/05448 | 7/1988 |
| WO | WO 96/37547 | 11/1996 |
| WO | WO 99/28376 | 6/1999 |
| WO | WO 02/088238 | 11/2002 |

OTHER PUBLICATIONS

M.J. Zohuriaan-Mehr and H. Omidian, J.M.S. Rev. Macromol. Chem. Phys., c40(1), pp. 23-49 (2000).
Brunauer, Emmet, and Teller, "The Journal of the American Chemical Society," vol. 60, p. 309, Feb. 1938.

* cited by examiner

*Primary Examiner*—Peter D. Mulcahy
(74) *Attorney, Agent, or Firm*—Fitzpatrick, Cella, Harper & Scinto

(57) ABSTRACT

The invention relates to a cross-linked rubber composition for a tire tread having a Shore A hardness greater than 45 and less than 57, measured in accordance with Standard ASTM D 2240, wherein the composition comprises
greater than 25 phr and up to 100 phr, of one or more diene elastomers each having a temperature Tg of between −75° C. and −40° C.,
less than 75 phr and down to 0 phr, of one or more diene elastomers each having a temperature Tg of between −110° C. and −75° C.,
from 5 phr to 35 phr, of at least one hydrocarbon plasticizing resin miscible in said elastomer(s), said resin having a Tg of between 10° C. and 150° C. and a molecular weight Mn of between 400 and 2000 g/mol, and
from 5 phr to 35 phr of at least one synthetic or natural plasticizing compound which comprises at least one glycerol fatty acid triester, wherein an aggregate constituted by the fatty acid(s) comprises oleic acid in a mass fraction equal to or greater than 60%.

37 Claims, No Drawings

RUBBER COMPOSITION FOR A TIRE TREAD

CROSS REFERENCE TO RELATED APPLICATIONS

This application is a continuation of International Patent Application No. PCT/EP2003/009334, filed Aug. 22, 2003, which claims priority to French Patent Application No. FR 02/10950, filed Sep. 4, 2002, all of which are incorporated in their entireties.

FIELD OF THE INVENTION

The present invention relates to a cross-linked rubber composition for use in a tire tread which is particularly suitable for travelling on icy, snow-covered or wet ground. This invention applies in particular to tires for passenger-type vehicles.

In recent years, attempts have been made to design tires devoid of studs intended to have improved grip on winter ground having a high sliding coefficient, such as icy or snow-covered ground. For example, it has been decided to use different types of inclusions in the tread compositions for winter tires, such as glass beads, synthetic fibers, mineral fillers or crumbs of natural products (nutshells, rice husks, etc.).

U.S. Pat. No. 5,967,211, discloses a rubber composition for a tire tread of "ice" type. This composition comprises elastomeric matrix diene elastomers having glass transition temperatures Tg less than −30° C., silica as a reinforcing filler and additives specifically provided to improve the grip of the tire on icy ground. These additives are comprised of organic fibers selected from among cellulose and wood fibers or hollow ceramic microspheres.

Tires which are specifically designed to have improved grip performance on icy or snow-covered ground generally exhibit disadvantages in wear resistance and impaired gripping on wet ground.

This degeneration of wear resistance results in a reduced life expectancy of the tires, which involves an increase in the quantity of worn tires sent for recycling. It also results in an increase over time of the debris from these tires which is thrown off onto the ground during travel, contributing to pollution in the environment.

It is well-known to one skilled in the art that an improvement in the grip performance of a tire on one particular type of ground is frequently obtained to the detriment of other performance types, such as the grip performance on a different type of ground having a radically different sliding coefficient. Wear resistance may suffer. To date there has been no real success in improving both the wear resistance and the grip performance on wet ground of tires of "ice" or "snow" type which are specially designed to have an improved grip on icy or snow-covered ground.

The object of the present invention is to overcome this drawback, and it is achieved in a cross-linked rubber composition having a Shore A hardness greater than 45 and less than 57, measured in accordance with Standard ASTM D 2240 of 1997, (a) of an elastomeric matrix comprising:
(phr: parts by weight per 100 parts of elastomer(s)):
   (i) greater than 25 phr and up to 100 phr, of one or more diene elastomers, each having a glass transition temperature Tg between −75° C. and −40° C.,
   (ii) less than 75 phr and down to 0 phr, of one or more diene elastomers, each having a glass transition temperature Tg between −110° C. and −75° C.,
(b) from 5 phr to 35 phr, of at least one hydrocarbon plasticizing resin miscible in the diene elastomer(s), the resin having a glass transition temperature Tg between 10° C. and 150° C. and a number-average molecular weight between 400 g/mol and 2000 g/mol, and
(c) from 5 phr to 35 phr, of at least one synthetic or natural plasticizing compound which comprises at least one glycerol fatty acid triester, wherein an aggregate constituted by the fatty acid(s) comprises oleic acid in a mass fraction equal to or greater than 60%.

The rubber composition of the invention is well suited for use in making a tire tread, advantageously of passenger-vehicle type, which is well-adapted to travelling on icy and snow-covered ground. The inventive tire tread incorporates plasticizing oils of aromatic, naphthenic and/or paraffinic type as the plasticizer, while displaying improved wear resistance and gripping performance on wet ground over known tires.

The inventive rubber composition uses a hydrocarbon plasticizing resin and a plasticizing compound, which imparts improved endurance to a tire that has treads which incorporate the inventive composition. The hydrocarbon plasticizing resin and plasticizing compound are included in amounts that partially or totally replace conventional plasticizing oils used in prior art compositions.

Tests have shown that this replacement makes it possible to minimize the migration of these oils (or to suppress it, if they are totally replaced) into the adjacent mixtures of the tire, thereby improving the resistance of the tire to the separation of the triangulation crown plies which it comprises in its crown reinforcement (this resistance to separation of the plies is sometimes referred to as resistance to "cleaving" by one skilled in the art).

According to another embodiment of the invention, the composition comprises plasticizing oil(s) of paraffinic, aromatic or naphthenic type in a quantity of from 0 phr to 15 phr. Advantageously the inventive composition may be devoid of plasticizing oils, where a hydrocarbon plasticizing resin and plasticizing compound are used to totally replace the plasticizing oil(s).

It will be noted that the improvement in the wear resistance of a tire tread according to the invention involves a reduction in the compaction by compression to which this tread is subjected to during travel. This reduction in loss during travel, also beneficially reduces pollution resulting from the plasticizers, such as the aromatic oil.

The result is a significant reduction in pollution of the environment, which is minimized still further by the reduced or zero quantity of aromatic oil, which is initially introduced into the tread composition according to the invention.

"Diene elastomer" is understood to mean, in known manner, an elastomer resulting at least in part (homopolymer or copolymer) from diene monomers (monomers bearing two double carbon-carbon bonds, whether conjugated or not).

A diene elastomer of the composition according to the invention is preferably "highly unsaturated," resulting from conjugated diene monomers, which have a greater than 50% molar content of units.

According to one preferred embodiment of the invention: each diene elastomer having a Tg between −75° C. and −40° C. is selected from the group consisting of styrenelbutadiene copolymers prepared in emulsion, natural polyisoprenes, synthetic polyisoprenes having a cis-1,4 linkage content greater than 95%, styrene/butadiene/isoprene terpolymers prepared in solution and a mixture of these elastomers, and each diene elastomer having a Tg between −110° C. and −75° C., preferably from −105° C. to −80° C., is selected from the group consisting of polybutadienes having a cis-1,4 linkage content greater than 90% and isoprene/butadiene copolymers prepared in solution comprising butadiene units in an amount equal to or greater than 50%.

Even more preferably, each diene elastomer having a Tg between −75° C. and −40° C. is selected from the group consisting of natural polyisoprenes and synthetic polyisoprenes having a cis-1,4 linkage content greater than 95%, and each diene elastomer having a Tg between −110° C. and −75° C. is a polybutadiene having a cis-1,4 linkage content greater than 90%.

According to a first example of an embodiment of the invention, the composition comprises a blend of the diene elastomer(s) having a Tg between −75° C. and −40° C. and the diene elastomer(s) having a Tg between −110° C. and −75° C.

According to a first advantageous embodiment of this first example, the composition comprises a blend of at least one of the polybutadienes having a cis-1,4 linkage content greater than 90% with at least one of the natural or synthetic polyisoprenes (having a cis-1,4 linkage content greater than 95%).

According to a second advantageous embodiment of this first example, the composition comprises a blend of at least one of the polybutadienes having a cis-1,4 linkage content greater than 90% with at least one of the terpolymers of styrene, isoprene and butadiene prepared in solution.

According to a second example of an embodiment of the invention, the composition comprises the diene elastomer(s) having a Tg between −75° C. and −40° C. in a quantity of 100 phr.

The plasticizing resin which is specifically selected to be used in the composition according to the invention is exclusively a hydrocarbon resin, which comprises only carbon and hydrogen atoms. This resin may be of aliphatic and/or aromatic type and is miscible in the diene elastomer(s). Hydrocarbon resins of "aliphatic" type defined in the article by M. J. Zohuriaan-Mehr and H. Omidian, J.M.S. REV. MACROMOL. CHEM. PHYS. C40(1), 23-49 (2000), are essentially formed of aliphatic units.

According to a first advantageous example of an embodiment of the invention, a plasticizing resin having a number-average molecular weight of from 400 to 2000 g/mol and a glass transition temperature greater than 50° C. and less than 120° C. which comprises, in a mass fraction of from 70% to 100%, units resulting from the polymerization of a monocyclic or bicyclic unsaturated terpene are used as a resin of "aliphatic" type.

Preferably, this "aliphatic" resin has a number-average molecular weight of from 500 to 1000 g/mol and, even more preferably, of from 550 to 700 g/mol. Equally preferably, this "aliphatic" resin has a glass transition temperature of from 60° C. to 100° C. and a polymolecularity index of less than 2.

According to another preferred embodiment, this "aliphatic" resin comprises the units resulting from the polymerization of a monocyclic or bicyclic unsaturated terpene in a mass fraction of from 90% to 100%.

According to a first mode of an embodiment of this first example, the unsaturated terpene from which the resin has resulted majoritarily or in its entirety is a monocyclic unsaturated terpene, preferably a limonene (i.e. 4-isopropenyl 1-methylcyclohexene) such as d-limonene (dextrorotatory enantiomer), or alternatively dipentene (racemate of the dextrorotatory and laevorotatory enantiomers of limonene).

In accordance with this first mode, the resin may furthermore comprise one or more units resulting from at least one hydrocarbon monomer which is not a monocyclic unsaturated terpene and which may advantageously be a bicyclic unsaturated terpene such as an α-pinene (i.e. 2,6,6-trimethylbicyclo[3.1.1]hept-2-ene), a monocyclic or polycyclic aromatic hydrocarbon such as styrene or an alkyl styrene, a cyclic diene such as dicyclopentadiene or a conjugated diene such as isoprene.

Still in accordance with this first mode, the resin may be constituted of the units resulting from the homopolymerization of the monocyclic unsaturated terpene, such as limonene or dipentene. A resin resulting in its entirety from the homopolymerization of d-limonene or dipentene, preferably a resin of number-average molecular weight of from 550 g/mol to 650 g/mol and a glass transition temperature of from 60° C. to 80° C., is advantageously usable.

It will be noted that d-limonene is a natural extract (it is found in its natural state in the skin of oranges) and that, consequently, the plasticizing resin resulting from the homopolymerization of this d-limonene is of exclusively natural origin, which contributes to reducing the pollution of the environment upon rolling of tires having treads which incorporate this resin.

According to a second mode of an embodiment of the first example, the unsaturated terpene from which the resin has resulted in a majority or in its entirety is a bicyclic unsaturated terpene, preferably an α-pinene.

In accordance with this second mode, the resin may furthermore comprise one or more units resulting from at least one hydrocarbon monomer which is not a bicyclic unsaturated terpene and which may advantageously be a monocyclic unsaturated terpene such as a limonene or dipentene, a monocyclic or polycyclic aromatic hydrocarbon such as styrene or an alkyl styrene, a cyclic diene such as dicyclopentadiene or a conjugated diene such as isoprene.

Still in accordance with this second mode, the resin may be constituted of the units resulting from the polymerization of the bicyclic unsaturated terpene, such as α-pinene.

According to a second advantageous example of an embodiment of the invention, a plasticizing resin of number-average molecular weight of from 400 to 2000 g/mol which comprises units resulting from the polymerization of vinylcyclohexene is used as a resin of "aliphatic" type.

Preferably, this resin has a number-average molecular weight of from 500 to 1500 g/mol and, even more preferably, of from 550 to 1000 g/mol. Equally preferably, the resin has a glass transition temperature of from 50° C. to 120° C. and, even more preferably, of from 60° C. to 100° C.

Equally preferably, this resin comprises the units resulting from the polymerization of vinylcyclohexene in a mass fraction greater than 50%. Advantageously, this mass fraction varies from 70% to 100% and, even more advantageously, it is equal to 100% (the resin in this case being exclusively formed of the units resulting from the polymerization of vinylcyclohexene).

According to one variant embodiment of this second example, the resin furthermore comprises one or more other units, at least one of which has resulted from the polymerization of a monocyclic or bicyclic unsaturated terpene.

A limonene or dipentene can advantageously be used as monocyclic unsaturated terpene. An α-pinene can advantageously be used as bicyclic unsaturated terpene.

According to another variant embodiment of this second example, the resin further comprises one or more other units, at least one of which has resulted from the polymerization of a monocyclic or polycyclic aromatic hydrocarbon, such as styrene or an alkyl styrene.

According to another variant embodiment of this second example, the resin furthermore comprises one or more other units, at least one of which has resulted from the polymerization of a cyclic diene, such as dicyclopentadiene, or of a conjugated diene, such as isoprene.

It will be noted that the mass fraction of aliphatic units in the "aliphatic" resin according to the invention is preferably greater than 95%.

Intermediate resins of "aliphatic/aromatic" type, where the mass fraction of aliphatic units varies from 80% to 95% (the mass fraction of aromatic units varying from 5% to 20%) are also usable in the composition according to the invention.

Hydrocarbon resins of "aromatic" type, defined in the article by M. J. Zohuriaan-Mehr and H. Omidian J.M.S. REV. MACROMOL. CHEM. PHYS. C40(1), 23-49 (2000), where the hydrocarbon chain comprises in a majority of aromatic units, styrene, xylene, α-methylstyrene, vinyl toluene or indene, are also usable in the composition according to the invention.

Preferably, these "aromatic" resins have a glass transition temperature of from 30° C. to 60° C., and comprise aliphatic and aromatic units in mass fractions which vary from 30% to 50% and from 70% to 50% respectively.

Suitable "aromatic" resins are, for example, the resins based on α-methylstyrene and methylene, and also the resins based on coumarone and indene.

According to one preferred embodiment of the invention, the hydrocarbon plasticizing resin has a Tg of from 30° C. to 120° C., preferably greater than 50° C. and less than 120° C., and has a number-average molecular weight Mn from 500 g/mol to 1000 g/mol.

According to another preferred embodiment of the invention, the synthetic or natural plasticizing compound is comprised of at least one glycerol fatty acid triester which is included in the inventive composition wherein an aggregate formed by the fatty acid(s) comprises oleic acid in a mass fraction equal to or greater than 85%.

According to one example of an embodiment of the invention, the plasticizing compound comprises at least one synthetic compound formed of a glycerol oleic acid triester.

According to another example of an embodiment of the invention, the plasticizing compound comprises at least one vegetable oil comprising the glycerol fatty acid triesters and having a Tg between −100 and −70° C., such as sunflower oil or rapeseed oil.

According to an advantageous example of an embodiment of the invention, the composition comprises the hydrocarbon plasticizing resin in a quantity of from 10 to 25 phr, and the plasticizing compound in a quantity of from 15 to 30 phr.

The composition according to the invention also comprises a reinforcing filler, in a quantity which may vary from 40 to 100 phr.

According to a first example of an embodiment of the invention, the reinforcing filler comprises a reinforcing inorganic filler in a mass fraction of from 50% to 100%.

In the present application, "reinforcing inorganic filler," is understood to mean an inorganic or mineral filler, whatever its color and its origin (natural or synthetic). It may be referred to as "white" filler or sometimes "clear" filler in contrast to carbon black. This inorganic filler is capable without any other means other than an intermediate coupling agent, of reinforcing a rubber composition intended for the manufacture of tires. That is, it is capable of replacing a conventional tire-grade carbon black filler in its reinforcement function.

Advantageously, the entirety or at the very least a majority proportion of the reinforcing inorganic filler is silica ($SiO_2$). The silica used may be any reinforcing silica known to one skilled in the art. In particular any precipitated or fumed silica having a BET surface area and a CTAB specific surface area which are less than 450 $m^2/g$, even if the highly dispersible precipitated silicas are preferred.

Preferably, a silica having a BET or CTAB specific surface areas which are both from 80 $m^2/g$ to 260 $m^2/g$ is used.

The BET specific surface area is determined in a known manner, in accordance with the method of Brunauer, Emmet and Teller described in "The Journal of the American Chemical Society," vol. 60, page 309, February 1938, and corresponding to Standard AFNOR-NFT-45007 (November 1987). The CTAB specific surface area is the external surface area determined in accordance with the same Standard AFNOR-NFT-45007 of November 1987.

"Highly dispersible silica" is understood to mean any silica having a very substantial ability to disagglomerate and to disperse in an elastomeric matrix, which can be observed in known manner by electron or optical microscopy on thin sections. As non-limitative examples of such preferred highly dispersible silicas, mention may be made of the silicas Ultrasil 7000 and Ultrasil 7005 from Degussa, the silicas Zeosil 1165MP, 1135MP and 1115MP from Rhodia, the silica Hi-Sil EZ150G from PPG, the silicas Zeopol 8715, 8745 and 8755 from Huber, and treated precipitated silicas such as, for example, the aluminium-"doped" silicas described in application EP-A-735 088.

The physical state in which the reinforcing inorganic filler is present is immaterial, whether it be in the form of a powder, microbeads, granules or alternatively balls. Of course, "reinforcing inorganic filler" is also understood to mean mixtures of different reinforcing inorganic fillers, in particular of highly dispersible silicas such as those described above.

As reinforcing inorganic filler, there may also be used, in non-limitative manner:

aluminas (of formula $Al_2O_3$), such as aluminas of high dispersibility which are described in European Patent Specification EP-A-810 258, or alternatively aluminium hydroxides, such as those described in International Patent Specification WO-A-99/28376.

Also suitable are reinforcing inorganic fillers comprising carbon blacks modified by silica such as, for example, the fillers sold by CABOT under the name "CRX 2000," which are described in International Patent Specification WO-A-96/37547.

According to a second example of an embodiment of the invention, the reinforcing filler comprises carbon black in a mass fraction of from 50% to 100%. All the carbon blacks conventionally used in tires, and in particular in treads for these tires, particularly blacks of the type HAF, ISAF and SAF, are suitable. Mention may be made in non-limitative manner of the blacks N 115, N134, N234, N339, N347 and N375.

According to a third example of an embodiment of the invention, the reinforcing filler comprises a blend of the reinforcing inorganic filler with carbon black, the mass fraction of carbon black in the reinforcing filler being preferably selected to be less than or equal to 30%.

For example, black/silica blends or blacks partially or entirely covered with silica are suitable to form the reinforcing filler.

The rubber composition according to the invention furthermore comprises, in conventional manner, a reinforcing inorganic filler/elastomeric matrix bonding agent (also referred to as coupling agent), which functions to ensure sufficient chemical and/or physical bonding (or coupling) between the inorganic filler and the matrix, while facilitating the dispersion of the inorganic filler within the matrix.

"Coupling agent" is more precisely understood to mean an agent capable of establishing a sufficient chemical and/or physical connection between the filler in question and the elastomer, while facilitating the dispersion of this filler within the elastomeric matrix. Such a coupling agent, which is at least bifunctional, has, for example, the simplified general formula "Y-T-X," in which:

Y represents a functional group ("Y" function) which is capable of bonding physically and/or chemically with the inorganic filler. The bond is able to be established, for example, between a silicon atom of the coupling agent and the surface hydroxyl (OH) groups of the inorganic filler (for example, surface silanols in the case of silica);

X represents a functional group ("X" function) which is capable of bonding physically and/or chemically with the elastomer, for example by means of a sulphur atom; and T represents a group making it possible to link Y and X.

The coupling agents must not be confused with simple agents for covering the filler in question which, may comprise the Y function but are devoid of the X function. The Y function is active with respect to the filler and the X function is active with respect to the elastomer.

Such coupling agents, of variable effectiveness, are well-known to one skilled in the art. In fact, any coupling agent known or likely to ensure, the effective bonding or coupling between a reinforcing inorganic filler such as silica and a diene elastomer, may be used in the diene rubber compositions for the manufacture of tires. For example, organosilanes, in particular polysulphurized alkoxysilanes or mercaptosilanes, or alternatively polyorganosiloxanes bearing the X and Y functions mentioned above, may be used.

Silica/elastomer coupling agents in particular have been described in a large number of documents, the best known being bifunctional alkoxysilanes such as polysulphurized alkoxysilanes.

In particular polysulphurized alkoxysilanes, which are referred to as "symmetrical" or "asymmetrical" depending on their specific structure, are used, such as those described for example in patents U.S. Pat. No. 3,842,111, U.S. Pat. No. 3,873,489, U.S. Pat. No. 3,978,103, U.S. Pat. No. 3,997,581, U.S. Pat. No. 4,002,594, U.S. Pat. No. 4,072,701, U.S. Pat. No. 4,129,585, or in the more recent patents U.S. Pat. No. 5,580,919, U.S. Pat. No. 5,583,245, U.S. Pat. No. 5,650,457, U.S. Pat. No. 5,663,358, U.S. Pat. No. 5,663,395, U.S. Pat. No. 5,663,396, U.S. Pat. No. 5,674,932, U.S. Pat. No. 5,675,014, U.S. Pat. No. 5,684,171, U.S. Pat. No. 5,684,172, U.S. Pat. No. 5,696,197, U.S. Pat. No. 5,708,053, U.S. Pat. No. 5,892,085 and EP-A-1 043 357, which set forth such known compounds in detail.

Particularly suitable for implementing the invention, without the definition below being limitative, are symmetrical polysulphurized alkoxysilanes which satisfy the following general formula (I):

Z-A-S$_n$-A-Z, in which: (I)

n is an integer from 2 to 8 (preferably from 2 to 5);

A is a divalent hydrocarbon radical (preferably $C_1$-$C_{18}$ alkylene groups or $C_6$-$C_{12}$ arylene groups, more particularly $C_1$-$C_{10}$ alkylenes, notably $C_1$-$C_4$ alkylenes, in particular propylene);

Z corresponds to one of the formulae below:

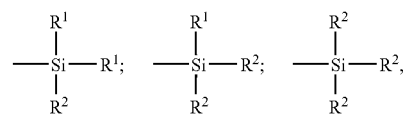

in which:

the radicals $R^1$, which may or may not be substituted, and may be identical or different, represent a $C_1$-$C_{18}$ alkyl group, a $C_5$-$C_{18}$ cycloalkyl group or a $C_6$-$C_{18}$ aryl group, (preferably $C_1$-$C_6$ alkyl groups, cyclohexyl or phenyl, in particular $C_1$-$C_4$ alkyl groups, more particularly methyl and/or ethyl).

the radicals $R^2$, which may or may not be substituted, and may be identical or different, represent a $C_1$-$C_{18}$ alkoxyl group or a $C_5$-$C_{18}$ cycloalkoxyl group (preferably $C_1$-C8 alkoxyl groups or $C_5$-$C_8$ cycloalkoxyl groups, more preferably $C_1$-$C_4$ alkoxyl groups, in particular methoxyl and/or ethoxyl).

In the case of a mixture of polysulphurized alkoxysilanes in accordance with Formula (I) above, in particular conventional, commercially available, mixtures, it will be understood that the average value of the "n"s is a fractional number, preferably within a range from 2 to 5.

As polysulphurized alkoxysilanes, mention will be made more particularly of the polysulphides (in particular disulphides, trisulphides or tetrasulphides) of bis-(($C_1$-$C_4$)alkoxyl-($C_1$-$C_4$)alkylsilyl-($C_1$-$C_4$)alkyl), such as for example the polysulphides of bis(3-trimethoxysilylpropyl) or of bis(3-triethoxysilylpropyl). Of these compounds, in particular bis(3-triethoxysilylpropyl)tetrasulphide, abbreviated TESPT, of the formula $[(C_2H_5O)_3Si(CH_2)_3S_2]_2$, or bis(triethoxysilylpropyl)disulphide, abbreviated TESPD, of the formula $[(C_2H_5O)_3Si(CH_2)_3S]_2$, are used. TESPD is sold, for example, by Degussa under the names Si266 or Si75 (in the latter case, in the form of a mixture of disulphide (75% by weight) and of polysulphides), or alternatively by Witco under the name Silquest A1589. TESPT is sold, for example, by Degussa under the name Si69 (or X50S when it is supported to 50% by weight on carbon black), or alternatively by Osi Specialties under the name Silquest A1289 (in both cases, a commercial mixture of polysulphides having an average value of n close to 4). Mention will also be made of tetrasulphurised monoalkoxysilanes, such as monoethoxydimethylsilylpropyl tetrasulphide (abbreviated to MESPT), which are the subject of international patent application PCT/EP02/03774 in the name of the Applicants.

It will be noted that at least one of the diene elastomers usable in the composition according to the invention may comprise one or more functional groups specifically active for coupling to the reinforcing filler.

For coupling to a reinforcing inorganic filler, all the functional, coupled or starred groups which are known to one skilled in the art for coupling to silica are suitable. Silanol or polysiloxane groups having a silanol end, as described in French patent specification FR-A-2 740 778, in the name of the Applicant. This document teaches using a functionalizing agent for a living polymer obtained anionically, in order to obtain a function which is active for coupling to silica. This functionalizing agent is formed of a cyclic polysiloxane, such as a polymethylcyclo -tri-, -tetra- or -deca-siloxane, the agent preferably being hexamethyl-cyclotrisiloxane. The functionalized polymers thus obtained can be separated from the reaction medium leading to their formation by steam extraction of the solvent, without their macrostructure and, consequently, their physical properties changing. Alkoxysilane groups are also sutiable.

The functionalization reaction described in international patent specification WO-A-88/05448 for coupling to silica, consists of reacting on a living polymer obtained anionically, an alkoxysilane compound having at least one non-hydrolysable alkoxy radical. This compound is selected from among the haloalkyl alkoxysilanes.

French patent specification FR-A-2 765 882, discloses the use of a trialkoxysilane, such as 3-glycidoxypropyltrialkoxysilane, for functionalizing a living diene polymer, for coupling to carbon black having silica fixed to its surface as a majority reinforcing filler.

For coupling to carbon black, functional groups comprising a C—Sn bond, may be used. Such groups may be obtained by reaction with a functionalizing agent of organohalotin type which corresponds to the general formula $R_3SnCl$, or with a coupling agent of organodihalotin type which corresponds to the general formula $R_2SnCl_2$, or with a starring agent of organotrihalotin type which corresponds to the general formula $RSnCl_3$, or of tetrahalotin type which corresponds to the formula $SnCl_4$ (where R is an alkyl, cycloalkyl or aryl radical).

For coupling to the carbon black, aminated functional groups may be used. For example, those obtained using 4,4'-bis-(diethylaminobenzophenone) or DEAB, may be used. Patent specifications FR-A-2 526 030 and U.S. Pat. No. 4,848,511 are mentioned by way of example.

The compositions according to the invention also comprise, in addition to the diene elastomer(s), a plasticizing resin, and a plasticizing compound. Optional components that may be included in the compositions of the invention are a plasticizing oil, a reinforcing inorganic filler and a bonding agent. In addition, other constituents and additives usually used in rubber compositions, such as pigments, antioxidants, antiozone waxes, a cross-linking system based on either sulphur and/or peroxide and/or bismaleimides, cross-linking activators comprising zinc monoxide and stearic acid, one or more covering agents for the reinforcing inorganic filler such as alkylalkoxysilanes, polyols, amines or amides, may be included.

The compositions according to the invention may further comprise:

swelling agents for producing microcellular mixtures, such as, for example, azodicarbonamide, dinitrosopentamethylenetetramine, dinitrosopentastyrenetetramine, benzenesulphonyl hydrazide and oxybisbenzenesulphonyl hydrazide (azodicarbonamide being preferably used);

minerals such as, for example, calcium carbonate, alumina, aluminium hydroxide or silicon carbide or organics such as crystalline polymers such as polyethylene, polypropylene, poly(ethylene succinate), syndiotactic 1,2-polybutadiene) inclusions; and synthetic fibers such as, for example, polyesters such as polyethylene terephthalate, aliphatic polyamides such as polyamide 6,6, aromatic polyamides such as aramid) or natural fibers such as, for example, cellulose, cotton, keratin, wool, hair, etc.

The compositions according to the invention may be prepared using known processes of thermomechanical working for the constituents in one or more stages. For example, they may be obtained by thermomechanical working in one stage in an internal mixer which lasts from 3 to 7 minutes, with a speed of rotation of the blades of 50 rpm, or in two stages in an internal mixer which last from 3 to 5 minutes and from 2 to 4 minutes respectively, followed by a finishing stage effected at about 80° C., during which the sulphur and the vulcanisation accelerators in the case of a composition which is to be sulphur-cross-linked are incorporated.

A tread according to the invention, which is suitable for travelling on icy and snow-covered ground while having in particular improved wear resistance and grip performance on wet ground, is manufactured with a rubber composition according to the invention.

A tire according to the invention comprises this tread.

It will be noted that the present invention applies to all types of tires, which may for example be intended to be fitted on motor vehicles or non-motor vehicles, such as touring or competition automobiles or two-wheeled vehicles—including bicycles and light-duty motor vehicles such as motorcycles, industrial vehicles selected from among vans, "heavy vehicles"—i.e. buses, road transport machinery (lorries, tractors, trailers), off-road vehicles, agricultural machinery or construction machinery, aircraft, or other transport or handling vehicles.

The tires according to the invention can also be used, advantageously on a passenger-type vehicle.

The aforementioned characteristics of the present invention, as well as others, are exemplified in the following examples, which are given by way of illustration and are not intended to limit the scope of the invention.

Determination of the Molecular Weights of the Resins According to the Invention by Size Exclusion Chromatography (SEC)

Size exclusion chromatography (SEC) makes it possible physically to separate macromolecules according to their size in the swollen state in columns filled with a porous stationary phase. The macromolecules are separated by their hydrodynamic volume, with the bulkiest being eluted first. On the basis of commercially available standards of polystyrene of low molecular weight (of between 104 and 90000 g/mol), the various number-average Mn and weight-average Mw molecular weights are determined and the polydispersity index Ip can be calculated. Each sample of resin is solubilized in tetrahydrofuran, at a concentration of about 1 g/l.

The apparatus used was a chromatograph "WATERS model Alliance 2690." The elution solvent was tetrahydrofuran (mobile phase), the flow rate was 1 ml/min., the temperature of the system was 35° C. and the duration of analysis was 40 min. A set of three columns in series, having the respective trade names "WATERS type STYRAGEL HR4E" (mixed-bed column), "WATERS type STYRAGEL HR1" (of a porosity of 100 Angstrom) and "WATERS STYRAGEL HRO.5" (of a porosity of 50 Angstrom) was used for the stationary phase.

The injected volume of the solution of each resin sample was 100 μl. The detector was a "WATERS model 2410" differential refractometer and the chromatographic data processing software was the "WATERS MILLENNIUM" (version 3-2) system.

Measurement of the Glass Transition Temperatures of the Elastomers and Plasticizers The glass transition temperatures Tg of the elastomers and plasticizers were measured by means of a differential calorimeter ("differential scanning calorimeter").

The measurements of Tg for the rubber compositions that incorporate these elastomers and plasticizers employed dynamic measurements carried out at a frequency of 10 Hz and at two different stress values, 0.2 MPa and 0.7 MPa, with the "MDC" measurements carried out in accordance with ISO Standard 4664 (the mode of deformation was shearing and the test pieces were cylindrical).

Measurement of the Properties of the Rubber Compositions

Mooney viscosity: ML(1+4) at 100° C. was measured in accordance with Standard ASTM D 1646.

Moduli of elongation ME100 (at 100%) was measured in accordance with Standard ASTM D 412.

Scott break index: breaking load (MPa) and elongation (in %) were measured at 23° C. in accordance with Standard ASTM D 412 of 1998.

Shore A hardness was measured in accordance with Standard ASTM D 2240 of 1997.

Hysteresis losses (HL) was measured in percent (%) by rebound at 60° C. at the sixth impact, in accordance with the following equation: HL (%)=100×($W_0$−$W_1$)/$W_1$, where $W_0$ is the energy supplied and $W_1$ is the energy restored.

Dynamic shear properties were measured in accordance with Standard ASTM D 2231-71, which was reapproved in 1977 (measurement as a function of the deformation carried out at 10 Hz with a peak-to-peak deformation of 0.15% to 50%, and measurement as a function of the temperature carried out at 10 Hz under a repetitive stress of 70 or 20 N/cm$^2$ with a temperature sweep of −80 to 100° C.).

Measurement of the Performance of the Tires

Relative performance indices, relative to a reference index 100 characterizing a "control" tire (a performance index greater than this base 100 indicating a performance superior to that of the corresponding "control" tire), were used.

The rolling resistance of each of the tires tested (dimensions 195/65 R15) was measured by running on a test drum, at an ambient temperature of 25° C., under a load of 392 daN and at a speed of 80 km/h, the internal pressure of the tire was 2.1 bar.

The wear resistance of each tire was determined by means of a relative wear index which is a function of the height of rubber remaining, after running on a winding road circuit, at an average speed of 77 km/h, and until the wear reaches the wear indicators located in the grooves in the treads. For Examples 1 to 4, this relative wear index was obtained by comparing the height of rubber remaining on a tread according to the invention with the height of rubber remaining on a "control" tread, which by definition has a wear index of 100.

The grip of the tires tested was evaluated by measuring braking distances in "ABS" braking mode, both on icy ground and on wet ground.

More precisely, the braking distance in "ABS" mode was measured, firstly, on wet ground, going from a speed of 40 km/h to 10 km/h on polished concrete ("PC" hereafter) with 2 mm of surface water, and, secondly going from a speed of 50 km/h to 10 km/h on asphalt concrete ("AC" hereafter) with 0.5 mm of surface water.

The grip on ice was evaluated on an ice run by measuring braking distances in "ABS" braking mode, going from 20 km/h to 5 km/h.

The grip on snow-covered ground was evaluated by a starting test on snow of alpine type, by measuring a distance covered in a time of 2 s at an engine speed of 2000 rpm.

The behavior on wet ground of each tire was evaluated by the time it took to cover one lap of a wetted winding road circuit, an attributed value of 101 corresponding to a gain of 1 second over this lap of the circuit.

The resistance of the tires to the separation of the crown plies was also evaluated by means of relative performance indices, relative to a reference index 100 characterizing a "control" tire (a performance index greater than this base 100 indicating a superior performance to that of the corresponding "control" tire).

This resistance was measured by a running test on a test drum, the surface of which is provided with obstacles (bars and "poplars" which stress the edges of the belt of the tire formed of two working crown plies WCP1 and WCP2), at an ambient temperature of 20° C., under a load of 490 daN and at a speed of 75 km/h, with the internal pressure of the tire being set to 2.5 bar. This test is stopped when a deformation of the crown reinforcement of the tire is detected.

Each tire was first "baked" (unmounted) for 4 weeks at 65° C.

The results obtained are expressed in the form of a mileage performance (base 100 for the "control" tire).

EXAMPLE 1

A "control" rubber composition T1 and a rubber composition in accordance with the invention I1 were prepared, each intended to constitute a tread of a "passenger-vehicle" ice-type tire of dimensions 195/65 R15 which is identical to the "passenger-vehicle" tires sold by MICHELIN under the name "Maxi ICE," with the exception of the tread compositions.

Table 1 below contains:

the formulation of each of these compositions T1 and I1;

the properties of each composition T1 and I1 in the non-vulcanized and vulcanized states;

the performances of the tires, the respective treads of which are formed of these compositions T1 and I1.

In Table 1:

NR is a natural rubber of "TSSR" type with a cis-1,4 linkage content of 100% and a glass transition temperature Tg of −65° C.;

cis BR is a polybutadiene having a cis-1,4 linkage content of approximately 93% and a glass transition temperature Tg of −103° C.;

The plasticizing resin R1 is a resin sold by HERCULES under the name "R2495, " comprising between 90% and 100% of units resulting from the polymerization of α-pinene and having:

an aliphatic linkage content of 97%, an aromatic linkage content of 0%, number-average Mn and weight-average Mw molecular weights respectively of 820 g/mol and 1060 g/mol, and a glass transition temperature Tg of 88° C.;

The vegetable oil H1 is an "oleic" sunflower oil of a Tg of −80° C. (i.e., comprising glycerol fatty acid triesters, such that the fatty acids comprise oleic acid in a mass fraction greater than 60%) sold by NOVANCE;

6PPD is N-(1,3-dimethyl-butyl)-N'-phenyl-p-phenylene-diamine; and CBS is N-cyclohexyl-benzothiazyl sulphenamide.

TABLE 1

|  | COMPOSITION T1 | COMPOSITION I1 |
|---|---|---|
| FORMULATION | | |
| Elastomeric matrix | NR (50 phr) cis BR (50 phr) | NR (50 phr) cis BR (50 phr) |
| Reinforcing filler | Silica Zeosil 1165MP (65 phr) | Silica Zeosil 1165 MP (65 phr) |
| Silane bonding agent "Si69" (from Dégussa) | 5.2 phr | 5.2 phr |
| DPG (diphenylguanidine) | 1.5 phr | 1.5 phr |
| Aromatic oil/Paraffin oil | 30/15 phr | 0 phr |
| Plasticizing resin R1 | 0 phr | 12 phr |
| Plasticizing compound (Vegetable oil H1) | 0 phr | 28 phr |
| Stearic acid/ZnO | 2 phr/2.5 phr | 2 phr/2.5 phr |
| Antioxidant (6PPD) | 2 | 2 phr |
| Sulphur/accelerator (CBS)° | 1 phr/2.0 phr | 1 phr/2.0 phr |
| PROPERTIES | | |
| Shore A | 55 | 53 |
| ME100 at 23° C. | 1.05 | 0.95 |
| HL at 60° C. | 19 | 20 |
| Dynamic properties at 10 Hz, at 0.2 MPa and at 0.7 MPa stress | | |
| Tg (MDC at 0.2 MPa) in ° C. | −51 | −52 |
| Tg (MDC at 0.7 MPa) in ° C. | −47 | −46 |
| PERFORMANCE OF THE TIRES (195/65 R15) | | |
| Wear resistance over 10000 km (at 5° C. on average on 10% wet and 90% dry ground on a Peugeot 306 XT) | 100 | 111 |
| Grip on ice Ice run Tground = −5° C./Tair = 2° C. On a Renault Laguna 2 l Braking distance ABS from 20 to 5 km/h | 100 | 100 |
| Starting on snow Tground = −10° C./Tair = 12° C. On a BMW 316 Distance over 2 s at 2000 rpm. | 100 | 104 |
| Grip on Wet Ground Tground = 10° C./Tair = 12° C. Braking distance on a Renault Laguna 2 l | | |
| Braking "PC" ABS from 40 to 10 km/h | 100 | 108 |
| Braking "AC" ABS from 50 to 10 km/h | 100 | 108 |
| Behavior on wet ground (at 80° C., on a BMW 323i) lap time | 100 | 105 |
| Rolling resistance (10 kg/tonne) | 100 | 97 |
| RESISTANCE OF TIRES TO CROWN PLY SEPARATION | | |
| Mileage performance | 100 | 116 |

It will be noted that the Tg of composition I1 according to the invention under a dynamic stress of high modulus (0.7 MPa) is made substantially equal to the corresponding Tg of the "control" composition T1.

As can be seen in Table 1, the variance between the Tg of compositions I1 and T1 (measured at a dynamic stress of low modulus, equal to 0.2 Mpa) is similar to the variance between the Tg of compositions I1 and T1 measured under a stress of high modulus.

This absence of difference between the Tg when passing from a stress of high modulus to a stress of low modulus expresses the fact that the resin R1 and the sunflower oil H1 are readily miscible in the elastomeric matrix constituted by the NR and the cis BR.

The performance results of the tires show that the incorporation of a plasticizing resin having a Tg between 10 and 150° C. and an Mn between 400 and 2000 g/mol (essentially comprised of units resulting from the polymerization of a bicyclic unsaturated terpene) and of an "oleic" sunflower oil in composition I1 according to the invention, wherein the Shore A hardness is equal to 53 and comprising a reinforcing inorganic filler as reinforcing filler, imparts to the corresponding tire a wear resistance and a grip on wet ground which show substantial improvement over the "control" tire having the tread composition T1 (the behavior on wet ground of a vehicle fitted with the tires according to the invention is also improved compared with the same behavior of a vehicle fitted with the "control" tires). The miscibility in the elastomeric matrix of the resin and the sunflower oil in the composition I1 contributed to the improvement, without adversely affecting the grip of the tires on winter ground such as snow or ice.

It will be noted that the composition I1 according to the invention is totally devoid of aromatic or paraffinic plasticizing oil, which advantageously contributes to protecting the environment. In contrast, the "control" composition T1 is comprised of large quantities of aromatic or paraffinic plasticizing oils, which are harmful to the environment.

It will furthermore be noted that the resin R1 and the oil H1 according to the invention impart improved endurance to the corresponding tires, insofar as they improve their resistance to separation of the triangulation crown plies which each of these tires comprises in its crown reinforcement.

EXAMPLE 2

A "control" tread composition T2 and a composition I2 according to the invention were prepared. Each composition was intended to constitute a tread of a "passenger-car" tire of dimensions 195/65 R15, which is identical to the "passenger-car" tires sold by MICHELIN under the name "Maxi ICE," with the exception of the tread compositions.

Table 2 below contains:

the formulation of each of these compositions T2 and I2;

the properties of each composition T2 and I2 in the non-vulcanized and vulcanized states;

the performances of the respective tires, with the respective treads formed with the compositions T2 and I2.

In Table 2, the plasticizing resin R2 is sold by DRT under the name "Dercolyte L120," and is comprised of between 90% and 100% of units resulting from the polymerization of limonene and having:

an aliphatic linkage content of 100%, an aromatic linkage content of 0%, a number-average Mn and weight-average Mw molecular weights respectively of 625 g/mol and 1010 g/mol, and a glass transition temperature Tg of 72° C.

TABLE 2

|  | COMPOSITION T2 | COMPOSITION I2 |
|---|---|---|
| FORMULATION | | |
| Elastomeric matrix | NR (40 phr) cis BR (60 phr) | NR (40 phr) cis BR (60 phr) |
| Reinforcing filler | Sil. Zeosil 1165 MP (25 phr) N234 (35 phr) | Silica Zeosil 1165MP (25 phr) N234 (35 phr) |
| Silane bonding agent "Si69" (from Dégussa) | 2 phr | 2 phr |
| DPG (diphenylguanidine) | 0.5 phr | 0.5 phr |
| Aromatic/paraffin oil | 30/15 phr | 0 phr |
| Plasticizing resin Ri | 0 phr | 15 phr |
| Vegetable oil Hi | 0 phr | 25 phr |

TABLE 2-continued

|  | COMPOSITION T2 | COMPOSITION I2 |
|---|---|---|
| Stearic acid/ZnO | 1 phr/2.5 phr | 1 phr/2.5 phr |
| Antioxidant (6PPD) | 2 phr | 2 phr |
| Sulphur/accelerator (CBS)° | 1.1 phr/2.0 phr | 1.1 phr/2.0 phr |
| PROPERTIES | | |
| Shore A | 55 | 54 |
| ME100 at 23° C. | 1.34 | 1.24 |
| HL at 60° C. | 20.5 | 21.5 |
| Dynamic properties at 10 Hz, at 0.2 MPa and at 0.7 MPa stress | | |
| Tg (MDC at 0.2 MPa) in ° C. | −53 | −55 |
| Tg (MDC at 0.7 MPa) in ° C. | −45 | −44 |
| PERFORMANCE OF THE TIRES (195/65 R15) | | |
| Wear resistance over 10,000 km (at 5° C. on average on 20% wet and 80% dry ground on a Peugeot 306 XT) | 100 | 107 |
| Grip on ice Ice run: Tground = −5° C./Tair = 5° C. On a Renault Laguna 2 l Braking distance ABS from 20 to 5 km/h | 100 | 101 |
| Starting on snow Tground = −5° C./Tair = −7° C. on a BMW 316 Distance over 2 s at 2000 rpm. Grip on Wet Ground Tground = 13° C./Tair = 13° C. Braking distance on a Renault Laguna 2 l | 100 | 102 |
| Braking PC ABS from 40 to 10 km/mh | 100 | 105 |
| Braking AC ABS from 50 to 10 km/h Behavior on wet ground | 100 | 105 |
| (at 10° C., on a BMW 323i) lap time | 100 | 105 |
| Rolling resistance (11 kg/tonne) | 100 | 97 |
| RESISTANCE OF TIRES TO CROWN PLY SEPARATION | | |
| Mileage performance | 100 | 116 |

It will be noted that the Tg of the composition I2 according to the invention (under a dynamic stress of high modulus (0.7 MPa)) is substantially equal to the corresponding Tg of the "control" composition T2.

As can be seen in Table 2, the variance between the Tg of the compositions I2 and T2 were measured at a dynamic stress of low modulus (equal to 0.2 Mpa), and found to be similar to the variance between the Tg of the compositions I2 and T2, which were measured under the stress of high modulus.

The absence of any difference between the Tg when passing from a stress of high modulus to a stress of low modulus expresses the fact that the resin R2 and the sunflower oil H1 are readily miscible in the elastomeric matrix constituted by the NR and the cis BR.

The performance results of the tires show that the incorporation of a plasticizing resin having a Tg between 10 and 150° C. and an Mn between 400 and 2000 g/mol (essentially constituted of units resulting from the polymerization of a monocyclic unsaturated terpene) and of an "oleic" sunflower oil in the tread composition I2 according to the invention, of Shore A hardness equal to 54 and comprising a blend of a reinforcing inorganic filler and carbon black as reinforcing filler, imparts to the corresponding tire a wear resistance and a grip on wet ground which are very substantially improved compared with those of the "control" tire incorporating the tread composition T2 (the behavior on wet ground of a vehicle fitted with these tires according to the invention is also improved compared with the same behavior of a vehicle fitted with the "control" tires), owing to the aforementioned miscibility in the elastomeric matrix of the resin and of the sunflower oil, and this without adversely affecting the grip of these tires according to the invention on winter ground of snow or ice type.

It will be noted that the composition I2 according to the invention is totally devoid of aromatic or paraffinic plasticizing oil, unlike the "control" composition T2 which comprises large quantities thereof, which contributes to protecting the environment.

It will furthermore be noted that the resin R2 and the oil H1 according to the invention impart improved endurance to the corresponding tires, insofar as they improve their resistance to separation of the triangulation crown plies which each of these tires comprises in its crown reinforcement

EXAMPLE 3

A "control" tread composition T3 and a composition according to the invention 13 were prepared, each being intended to constitute a tread of a "top-of-range passenger-car" tire of ice type of dimensions 195/65 R15 which is identical to the "passenger-car" tires sold by MICHELIN under the name "Maxi ICE," with the exception of the tread compositions.

Table 3 below contains:

the formulation of each of these compositions T3 and 13;

the properties of each composition T3 and I3 in the non-vulcanised and vulcanised states;

the performances of tires, the respective treads of which are formed of these compositions T3 and 13.

In this Table 3, the plasticizing resin R3 is a resin sold by ARIZONA under the name "Sylvagum TR7125C," comprising between 90% and 100% of units resulting from the polymerization of dipentene and having:

an aliphatic linkage content of 100%, an aromatic linkage content of 0%, number-average Mn and weight-average Mw molecular weights respectively of 630 g/mol and 950 g/mol, and a glass transition temperature Tg of 70° C.

TABLE 3

|  | COMPOSITION T3 | COMPOSITION I3 |
|---|---|---|
| FORMULATION | | |
| Elastomeric matrix | NR (70 phr) cis BR (30 phr) | NR (70 phr) cis BR (30 phr) |
| Reinforcing filler | Black N234 (55 phr) | Black N234 (55 phr) |
| Aromatic/paraffin oil | 40 phr | 0 phr |
| Plasticizing resin R3 | 0 phr | 10 phr |
| Vegetable oil H1 | 0 phr | 25 phr |
| Stearic acid/ZnO | 0.5 phr/3 phr | 0.5 phr/3 phr |
| Antioxidant (6 PPD) | 2 phr | 2 phr |
| Sulphur/accelerator (CBS)° | 2.5 phr/2.2 phr | 2.5 pbr/2.2 phr |
| PROPERTIES | | |
| Shore A | 55 | 54 |
| ME100 at 23° C. | 1.50 | 1.42 |
| HL at 60° C. | 22 | 24 |
| Dynamic properties at 10 Hz, at 0.2 MPa and at 0.7 MPa stress | | |
| Tg (MDC at 0.2 MPa) in ° C. | −52 | −53 |
| Tg (MDC at 0.7 MPa) in ° C. | −46 | −44 |
| PERFORMANCE OF THE TIRES (195/65 R15) | | |
| Wear resistance over 10,000 km (at 10° C. on average on 20% wet and 80% dry ground on a Peugeot 306 XT) | 100 | 105 |

TABLE 3-continued

|  | COMPOSITION T3 | COMPOSITION I3 |
|---|---|---|
| Grip on ice<br>Ice run: Tground = −5° C./Tair = 5° C.<br>On a Renault Laguna 2 l<br>Braking distance ABS from 20<br>to 5 km/h | 100 | 102 |
| Starting on snow<br>Tground = −5° C./Tair = −7° C.<br>on a BMW 316<br>Distance over 2 s at 2000 rpm.<br>Grip on Wet Ground<br>Tground = 13° C./Tair = 13° C.<br>Braking distance on a<br>Renault Laguna 2 l | 100 | 103 |
| Braking "PC" ABS from 40 to 10 km/h | 100 | 104 |
| Braking "AC" ABS from 50 to 10 km/h | 100 | 104 |
| Behavior on wet ground<br>(at 10° C., on a BMW 323i) lap time | 100 | 104 |
| Rolling resistance (11 kg/tonne) | 100 | 98 |
| RESISTANCE OF TIRES TO CROWN PLY SEPARATION | | |
| Mileage performance | 100 | 116 |

It will be noted that the Tg of the composition I3 according to the invention under a dynamic stress of high modulus (0.7 MPa) is set relatively close to the corresponding Tg of the "control" composition T3.

As can be seen in Table 3, the variance between the Tg of the compositions I3 and T3 which were measured at a dynamic stress of low modulus, equal to 0.2 MPa, is close to the variance between the Tg of the compositions I3 and T3 which were measured under the stress of high modulus.

This absence of difference between the Tg when passing from a stress of high modulus to a stress of low modulus expresses the fact that the resin R3 and the sunflower oil H1 are readily miscible in the elastomeric matrix constituted by the NR and cis BR.

The performance results of the tires show that the incorporation of a plasticizing resin having a Tg between 10 and 150° C. and an Mn of between 400 and 2000 g/mol (essentially comprised of units resulting from the polymerization of a monocyclic unsaturated terpene) and of an "oleic" sunflower oil in the tread composition I3 according to the invention, wherein the Shore A hardness is equal to 54 and comprising carbon black as reinforcing filler, imparts to the corresponding tire a wear resistance and a grip on wet ground which show substantial improvement over the "control" tire having the tread composition T2 (the behavior on wet ground of a vehicle fitted with the tires according to the invention is also improved compared with the same behavior of a vehicle fitted with the "control" tires). The miscibility in the elastomeric matrix of the resin and the sunflower oil in the composition I1 contributed to the improvement, without adversely affecting their rolling resistance and the grip of the tires on winter ground such as snow or ice.

It will be noted that the composition I3 according to the invention is totally devoid of aromatic or paraffinic plasticizing oil, which advantageously contributes to protecting the environment. In contrast, the "control" composition T3 which includes large quantities of aromatic or paraffinic plasticizing oils, which are harmful to the environment.

It will furthermore be noted that the resin R3 and the oil H1 according to the invention impart improved endurance to the corresponding tires, insofar as they improve their resistance to separation of the triangulation crown plies which each of these tires comprises in its crown reinforcement The invention of claimed is:

1. A tire tread comprising a cross-linked rubber composition having a Shore A hardness greater than 45 and less than 57, measured in accordance with Standard ASTM D 2240 of 1997, said composition comprising:
    greater than 25 phr and up to 100 phr, of one or more diene elastomers each having a glass transition temperature Tg between −75° C. and −40° C.,
    less than 75 phr and down to 0 phr, of one or more diene elastomers each having a glass transition temperature Tg between −110° C. and −75° C.,
    from 5 phr to 35 phr, of at least one hydrocarbon plasticizing resin miscible in said diene elastomer(s), and said resin having a glass transition temperature Tg between 10° C. and 150° C. and a number-average molecular weight between 400 g/mol and 2000 g/mol, and
    from 5 phr to 35 phr, of natural plasticizing compound, comprising at least one glycerol fatty acid triester, wherein the at least one glycerol fatty acid triester is sunflower vegetable oil having a Tg between −100° C. and −70° C., and wherein oleic acid represents in a mass fraction at least 60% of the total of fatty acid(s).

2. A tire tread according to claim 1, wherein
said diene elastomer having a Tg between 75° C. and 40° C. is selected from the group consisting of styrene/butadiene copolymers prepared in emulsion, natural polyisoprenes, synthetic polyisoprenes having a cis-1,4 linkage content greater than 95%, styrene/butadiene/isoprene terpolymers prepared in solution and mixtures thereof, and
said diene elastomer having a Tg between −110° C. and −75° C. is selected from the group consisting of polybutadienes having a cis-1,4 linkage content greater than 90% and isoprene/butadiene copolymers prepared in solution.

3. A tire tread according to claim 2, wherein
said diene elastomer having a Tg between −75° C. and −40° C. is selected from the group consisting of natural polyisoprenes and synthetic polyisoprenes having a cis-1,4 linkage content greater than 95%, and
said diene elastomer having a Tg between −110° C. and −75° C. is a polybutadiene having a cis-1,4 linkage content greater than 90%.

4. A tire tread according to claim 1, wherein said rubber composition is comprised of a blend of said diene elastomer(s) of a Tg between −75° C. and −40° C., and of said diene elastomer(s) of a Tg between −110° C. and −75° C.

5. A tire tread according to claim 1, wherein said rubber composition has 100 phr of said diene elastomer(s) of a Tg between −75° C. and −40° C.

6. A tire tread according to claim 1, wherein said resin has a Tg from 30° C. to 120° C., and a number-average molecular weight Mn of from 500 g/mol to 1000 g/mol.

7. A tire tread according to claim 6, wherein said resin has a Tg greater than 50° C. and less than 120° C.

8. A tire tread according to claim 7, wherein said resin is comprised of units resulting from the polymerization of a monocyclic or bicyclic unsaturated terpene, in a mass fraction of from 70% to 100%.

9. A tire tread according to claim 8, wherein said resin has a glass transition temperature of from 60° C. to 100° C.

10. A tire tread according to claim 8, wherein said unsaturated terpene is a monocyclic unsaturated terpene.

11. A tire tread according to claim 9, wherein said unsaturated terpene is a monocyclic unsaturated terpene.

12. A tire tread according to claim 10, wherein said monocyclic unsaturated terpene is limonene or dipentene.

13. A tire tread according to claim 11, wherein said monocyclic unsaturated terpene is limonene or dipentene.

14. A tire tread according to claim 10, wherein said resin further comprises one or more units resulting from at least one hydrocarbon monomer selected from the group consisting of bicyclic unsaturated terpenes, monocyclic aromatic hydrocarbons, polycyclic aromatic hydrocarbons, cyclic dienes and conjugated dienes.

15. A tire tread according to claim 14, wherein said at least one hydrocarbon monomer is selected from the group consisting of α-pinene, styrene, alkyl styrene, dicyclopentadiene and isoprene.

16. A tire tread according to claim 10, wherein said resin is formed of said units resulting from the polymerization of said monocyclic unsaturated terpene.

17. A tire tread according to claim 16, wherein said monocyclic unsaturated terpene is limonene or dipentene.

18. A tire tread according to claim 8, wherein said unsaturated terpene is a bicyclic unsaturated terpene.

19. A tire tread according to claim 9, wherein said unsaturated terpene is a bicyclic unsaturated terpene.

20. A tire tread according to claim 18, wherein bicyclic unsaturated terpene is an α-pinene.

21. A tire tread according to claim 18, wherein said resin further comprises one or more units resulting from at least one hydrocarbon monomer selected from the group consisting of monocyclic unsaturated terpenes, monocyclic aromatic hydrocarbons, polycyclic aromatic hydrocarbons, cyclic dienes and conjugated dienes.

22. A tire tread according to claim 21, wherein said at least one hydrocarbon monomer is selected from the group consisting of limonene, dipentene, styrene, alkyl styrene, dicyclopentadiene and isoprene.

23. A tire tread according to claim 18, wherein said resin is formed of said units resulting from the polymerization of said bicyclic unsaturated terpene.

24. A tire tread according to claim 23, wherein bicyclic unsaturated terpene is an α-pinene.

25. A tire tread according to claim 7, wherein said resin comprises units resulting from the polymerization of vinylcyclohexene.

26. A tire tread according to claim 25, wherein said resin is formed of said units resulting from the polymerization of vinylcyclohexene.

27. A tire tread according to claim 25, wherein said resin further comprises one or more other units at least one of which has resulted from the polymerization of a hydrocarbon selected from the group consisting of monocyclic unsaturated terpenes, bicyclic unsaturated terpenes, monocyclic aromatic hydrocarbons, polycyclic aromatic hydrocarbons, cyclic dienes and conjugated dienes.

28. A tire tread according to claim 27, wherein said at least one hydrocarbon is selected from the group consisting of limonene, dipentene, α-pinene, styrene, alkyl styrene, dicyclopentadiene and isoprene.

29. A tire tread according to claim 1, wherein in said plasticizing compound, an aggregate formed by said fatty acid(s) comprises oleic acid in a mass fraction equal to or greater than 85%.

30. A tire tread according to claim 1, wherein said composition further comprises, from 0 phr to 15 phr, of one or more plasticizing oils extracted from petroleum of paraffinic, aromatic or naphthenic type.

31. A rubber compositien tire tread according to claim 30, wherein said composition is devoid of plasticizing oil extracted from petroleum.

32. A rubber compositien tire tread according to claim 1, wherein said composition comprises from 10 phr to 25 phr of said hydrocarbon plasticizing resin, and from 15 phr to 30 phr of said plasticizing compound.

33. A tire tread according to claim 1, said composition further comprising a reinforcing filler, wherein said reinforcing filler comprises a reinforcing inorganic filler in a mass fraction of from 50% to 100%.

34. A tire tread according to claim 1, said composition further comprising a reinforcing filler, wherein said reinforcing filler comprises carbon black in a mass fraction of from 50% to 100%.

35. A tire tread according to claim 1, said composition further comprising a reinforcing filler, wherein said reinforcing filler comprises a blend of a reinforcing inorganic filler and a carbon black.

36. A tire comprising a tire tread according to claim 1.

37. A tire according to claim 36, wherein said tread is a winter tread suitable for travelling on icy and snow-covered roads.

* * * * *

UNITED STATES PATENT AND TRADEMARK OFFICE
CERTIFICATE OF CORRECTION

PATENT NO. : 7,253,225 B2
APPLICATION NO. : 11/071500
DATED : August 7, 2007
INVENTOR(S) : Gerard Labauze et al.

It is certified that error appears in the above-identified patent and that said Letters Patent is hereby corrected as shown below:

COLUMN 2

Line 65, "styrenelb-" should read --styrene/b- --.

COLUMN 4

Line 1, "(i.e." should read --(i.e.,--.
    Line 9, "(i.e." should read --(i.e.,--.

COLUMN 6

Line 63, "N 115," should read --N115,--.

COLUMN 8

Line 24, "$C_1$ - C8" should read --$C_1$ - $C_8$--.
    Line 38, "bis(3-triethoxysilylpropyl)tetrasulphide," should read
        --bis(3-triethoxysilylpropyl) tetrasulphide,--.
    Line 40, "bis(3-triethoxysilylpropyl)disulphide, should read
        --bis(3-triethoxysilylpropyl) disulphide,--.

COLUMN 9

Line 56, "diene)" should read --diene--.
    Line 59, "aramid)" should read --aramid--.

COLUMN 10

Line 18, "vehicles–i.e." should read --vehicles–i.e.,--.
    Line 22, "used," should read --used--.
    Line 53, "HRO.5" should read --HR0.5--.

COLUMN 12

Line 52, "The" should read --the--.
    Line 61, "The" should read --the--.
    Line 64, "NOVANCE;" should read --NOVANCE; and--.

UNITED STATES PATENT AND TRADEMARK OFFICE
CERTIFICATE OF CORRECTION

PATENT NO. : 7,253,225 B2
APPLICATION NO. : 11/071500
DATED : August 7, 2007
INVENTOR(S) : Gerard Labauze et al.

It is certified that error appears in the above-identified patent and that said Letters Patent is hereby corrected as shown below:

COLUMN 14

Line 36, "12;" should read --I2;--.
Line 37, "12" should read --I2--.
Line 40, "12." should read --I2.--
Line 65, Table 2, "Plasticizing resin Ri" should read
  --Plasticizing resin R2--.
Line 66, Table 2, "Vegetable oil Hi" should read --Vegetable oil H1--.

COLUMN 16

Line 14, "reinforcement" should read --reinforcement.--.
Line 19, "invention 13" should read --invention I3--.
Line 26, "13;" should read --I3;--.
Line 30, "13." should read --I3.--.
Line 53, Table 3, "Antioxidant (6 PPD)" should read
  --antioxidant (6PPD)--.

COLUMN 17

Line 62, "which" should be deleted.

COLUMN 18

Line 2, "reinforcement" should read --reinforcement.--.
Line 3, "of" should be deleted.
Line 27 Claim 2, "75°C. and 40°" should read --40°--.

UNITED STATES PATENT AND TRADEMARK OFFICE
CERTIFICATE OF CORRECTION

PATENT NO. : 7,253,225 B2
APPLICATION NO. : 11/071500
DATED : August 7, 2007
INVENTOR(S) : Gerard Labauze et al.

It is certified that error appears in the above-identified patent and that said Letters Patent is hereby corrected as shown below:

<u>COLUMN 20</u>

Line 21 Claim 31, "rubber compositien" should be deleted.
Line 25 Claim 32, "rubber compositien" should be deleted.

Signed and Sealed this

Third Day of June, 2008

JON W. DUDAS
*Director of the United States Patent and Trademark Office*